April 15, 1958 W. S. ZWAYER 2,830,375
INTERNAL GAUGE STRUCTURE
Filed Aug. 23, 1954 2 Sheets-Sheet 1
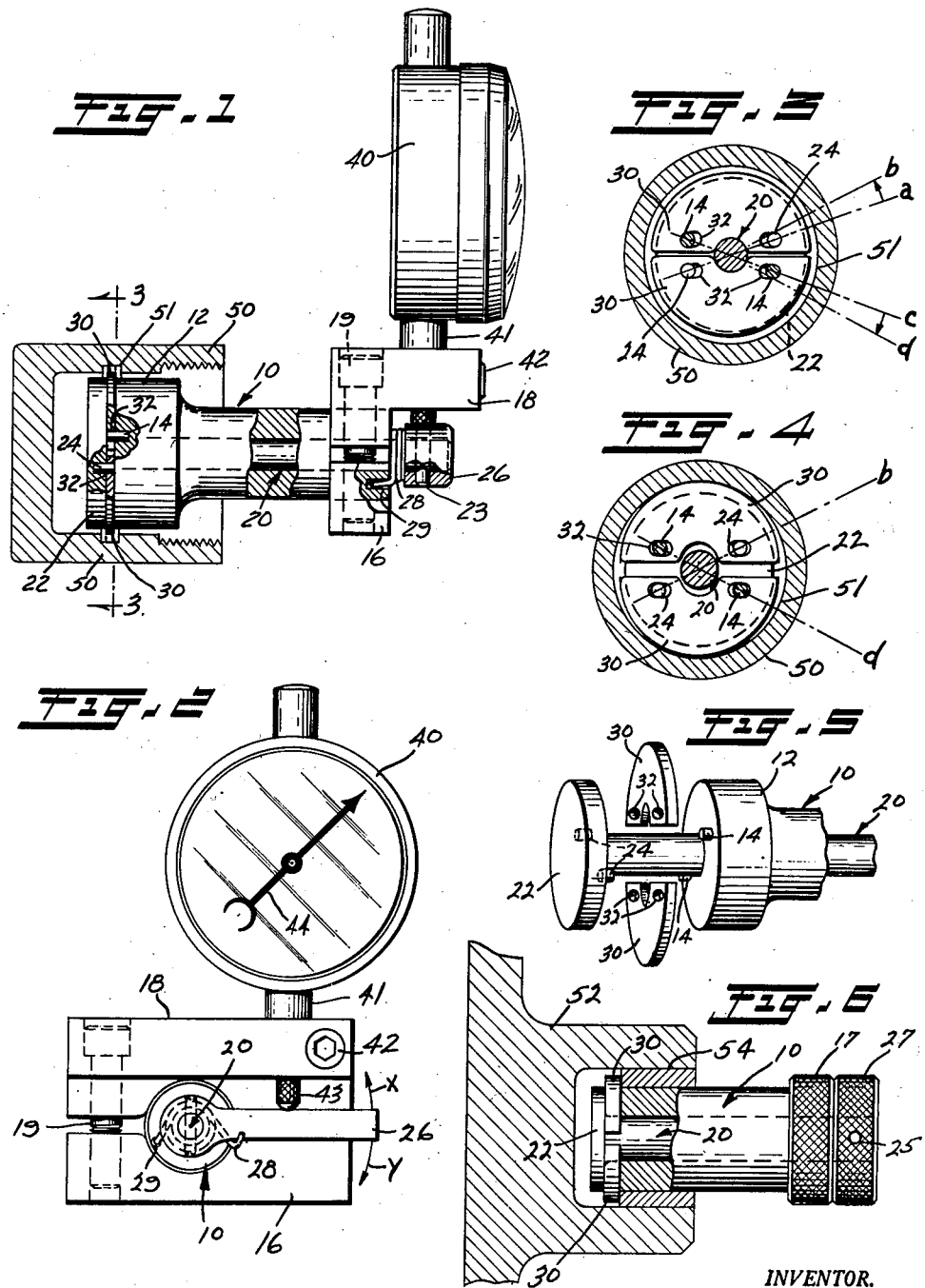
INVENTOR.
William S. Zwayer
BY
Bair, Freeman & Molinare
Attys.

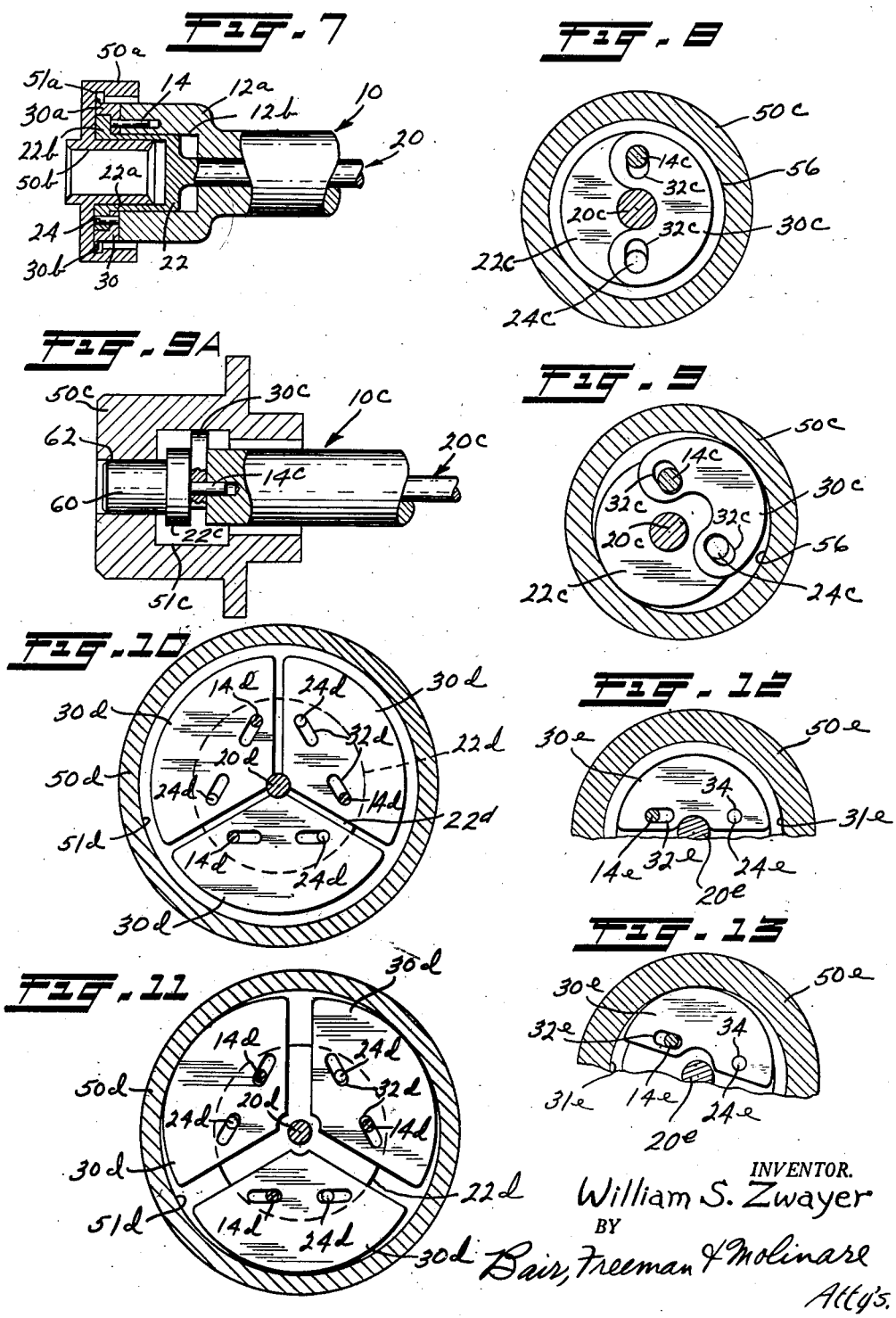

United States Patent Office 2,830,375
Patented Apr. 15, 1958

2,830,375

INTERNAL GAUGE STRUCTURE

William S. Zwayer, Bryan, Ohio; Nora B. Zwayer, administratrix of said William S. Zwayer, deceased Application August 23, 1954, Serial No. 451,565

10 Claims. (Cl. 33—178)

This invention relates to a mechanism which can be advantageously used as an internal gauge structure or designed for other purposes such as a puller for a bushing within a blind bore.

One object of the invention is to provide an expansible structure, the expansion of which can be indicated on a gauge; or the expansible parts of which may be used as a shoulder for pulling bushings and the like.

More specifically, it is one object of my present invention to provide an expansible structure in the form of a sleeve element, a shaft element oscillatable therein, and one or more expansible elements associated with the sleeve and shaft elements and capable of contractible and expansible adjustment by means of pins extending from both the shaft and sleeve elements and entering openings of the expansible element.

Another object is to provide for relatively rotating the shaft and sleeve elements and thereby expanding or contracting the expansible element or elements as desired.

Still another object is to provide means to indicate the diameter of the expansible element or elements when in expanded position whereby the device may be used as an internal gauge for measuring internal diameters of machine parts and the like.

A further object is to provide means for supporting a dial indicator or dial gauge on the sleeve and provide means on the shaft for contacting the actuating pin of the dial gauge so that the gauge registers the rotation of the shaft relative to the sleeve, thereby giving an indication of the diameter to which the expansible element or elements have been adjusted.

Still a further object is to provide sleeve, shaft and expansible elements that can be varied in design to accommodate various shapes of work yet perform their intended functions without loss of accuracy.

An additional object is to provide knobs or the like attached to the sleeve and the shaft for rotating one relative to the other to expand the expansible element or elements, whereupon the device may be used as a bushing puller.

With these and other objects in view, my invention consists in the construction, arrangement and combination of the various parts of my disclosed structure, whereby the objects above contemplated are attained, as hereinafter more fully set forth, pointed out in my claims and illustrated in detail on the accompanying drawings, wherein:

Figure 1 is a side elevation partly in section showing my internal gauge structure in use, portions of the structure being broken away and other portions being shown in section to illustrate details.

Figure 2 is a front elevation of my internal gauge structure as viewed from the right hand end of Figure 1.

Figure 3 is a sectional view on the line 3—3 of Figure 1 showing the expansible part of the gauge structure inserted in the work such as a sleeve and not yet expanded.

Figure 4 is a similar sectional view showing the expansible part expanded for contacting the bore of the work.

Figure 5 is an exploded perspective view of two expansible elements and their actuating parts.

Figure 6 is a sectional view similar to Figure 1 showing a modified construction of the expansible structure being used as a bushing puller instead of a gauge as in Figures 1 to 4.

Figure 7 is a sectional view similar to Figure 1 showing how the structure may be modified to adapt it to special shapes of work.

Figure 8 is a view similar to Figure 3 showing how a single expansible element can be used in place of a pair thereof as in Figure 3.

Figure 9 is a similar sectional view showing the single expansible element expanded to its maximum position; and Figure 9A is a sectional view similar to Figure 1 showing another way to use the modification shown in Figures 8 and 9.

Figures 10 and 11 are views similar to Figures 3 and 4, or 8 and 9, showing three expansible elements for greater expansion in proportion to their size.

Figures 12 and 13 are views similar to Figures 3 and 4 showing how the expansible element may be provided with a hole and slot, rather than a pin and slot.

On the accompanying drawings I have used the reference numeral 10 to indicate in general a sleeve and 20 a shaft which is oscillatable therein. I have used reference numerals in the teen series for parts associated with the sleeve 10 and in the twenty series for parts associated with the shaft 20.

The parts just referred to for the sleeve 10 comprise a head 12 at one end thereof having a pair of pins 14 projecting therefrom. A clamp block 16 is clamped to the sleeve 10 by a clamp screw 19 and is provided with a flange 18, the purpose of which will hereinafter appear.

The parts associated with the shaft 20 are a disc-like head 22 having a pair of pins 24 projecting therefrom and an arm 26 secured thereto as by a pin 23. A spring 28 is wrapped around the shaft 20 and has one end engaging the arm 26 and its other end entering a hole 29 in the sleeve 10 for the purpose of imparting counterclockwise rotation (in Fig. 2) to the shaft 20 and the arm 26.

In the thirty series I provide a pair of expansible elements 30 having non-circumferential slots 32 therein. These elements 30 are each substantially one-half of a washer (or are C-shaped or arc-shaped) as shown in Figs. 3, 4 and 5. The slots 32 receive the pins 14 and 24 projecting toward each other from the heads 12 and 22 as shown in Fig. 5, the parts in this figure being assembled by first bringing the elements 30 toward each other to contact the shaft 20 and then bringing the head 22 toward the head 12, whereupon the pins enter the slots to assume the position shown in Fig. 3.

The slots 32 may be arranged at various angles from radial to near circumferential. Obviously, circumferential slots would not produce the desired expansion of the elements 30 and radial slots would produce the maximum expansion per increment of relative rotation of 10 and 20. The angle shown in Fig. 3 (parallel to the adjacent edges of 30) has been selected arbitrarily. Due to the possible variation of angle which would be suitable, I call for "non-circumferential" slots in my claims.

A dial indicator or dial gauge 40 is mounted in the flange 18 as by slotting the flange adjacent the shank 41 of the gauge and providing a clamp 42. The gauge has an actuating pin 43 extending therefrom to be engaged by the arm 26. The actuating stem 43 is spring extended in the usual manner so that it contacts the arm 26 constantly, and it is obvious therefore that any counter-clockwise rotation of the shaft 20 will move the indicating needle 44 of the gauge 40 in a positive or clockwise direction. This direction results from movement of the arm 26 in the direction indicated by the arrow $x$ in Fig. 2, whereas movement of the arm 26 in a negative direction is indicated by the arrow $y$. I have described counter-clockwise operation, but it is obvious that if the pins 14 and 24 are reversely engaged in the slots 32, clockwise instead of counter-clockwise operation may be had if desired.

In Fig. 6 I show a knurled knob 17 mounted on the sleeve 10 in place of the clamp block 16 and a similar knurled knob 27 mounted on the shaft 20 and pinned thereto as at 25. With this arrangement the device can serve as a bushing puller for a bushing 54 relative to a bearing 52 and, as will be obvious upon an inspection of Fig. 6, can serve as such puller in a blind bore of the bearing or the like.

In Fig. 7 I show how the head 22 may be extended sleeve-like at 22a and terminate in an outturned flange 22b to accommodate a hub 50b of a special shape of work 50a having the groove 51a therein to be gauged. In the arrangement shown, the expansible elements 30 are extended sleeve-like at 30a to surround the periphery of the head portion 22b and a relatively thin outturned flange 30b is provided projecting outwardly from the portion 30a to gauge the relatively narrow counterbore or groove 51a. To accommodate the shape of head 22 with its extension 22b, the sleeve head 12a, comparable to the head 12 in Fig. 1, may have an enlarged bore 12b as disclosed in this figure. The shapes of the parts may be modified as thus disclosed and it is obvious that many other modifications can be made to fit the gauge to a particular shape of work yet utilize the basic principles disclosed.

In Figs. 8 and 9 I show how a single expansible element 30c can be utilized in opposition to the head 22c to measure the bore 56 of the work 50c. Parts in Figs. 8 and 9 (and also Fig. 9A) corresponding to parts in Figs. 1 to 5 bear the same reference numerals with the addition of the distinguishing characteristic "c." In Fig. 8 the closed or minimum size position is shown, whereas in Fig. 9 the open or near-maximum size position is shown.

In Fig. 9A I show a further modification using the single expansible element 30c of Fig. 8 to measure an internal groove 51c of the work 50c where there is a bore such as 62 that can accommodate an extension 60 of the head 22c. The extension is of the proper size to fit the bore 62 of the work 50c. In this case, the difference between the bore 62 and the groove 51c is measured by the expansion of the element 30c and may be converted to diameter of 51c by adding twice this difference to the diameter of 62.

In Figs. 10 and 11, I show how three of the expansible elements 30d are designed to utilize my expansion principle. In these two figures, parts comparable to the previous figures bear the same reference numerals with the addition of "d." Fig. 10 shows the minimum size and Fig. 11 the near-maximum size to which the expansible elements 30d may be expanded. It is obvious from the foregoing description of modifications that any suitable number of the expansible elements, from one on up, can be used and for different shaped pieces of work, one may be more suitable than another. In all cases, however, the same operating principle is involved.

In Figs. 12 and 13, I show the closed and open positions of an arrangement like Figs. 3 and 4 that uses two expansible elements 30e, but instead of each one having two slots 32e, one slot and a hole 34 may be provided and the hole may receive the pin 24e as shown or pin 14e as desired. The relative oscillation between 10e and 20e, again, however, as shown in Fig. 13, results in outward movement of the expansible element 30e, pivoting around the pin 24e in the hole 34 and with the pin 14e sliding in the slot 32e as will be obvious from comparing Fig. 13 with Fig. 12.

*Practical operation*

In the operation of my disclosed device as an internal gauge structure the expansible arc-shaped elements 30 may be contracted as in Fig. 3 with the pins 14 on a center line $a$ and the pins 24 on a center line $c$. In this condition the expansible structure is inserted into the bore of the work 50 for measuring a groove 51 therein. Expansion of the structure is then permitted by releasing the arm 26, whereupon the spring 28 rotates the shaft 20 counter-clockwise, thus rotating the axis of the pins 24 from $a$ to $b$ in Fig. 3, the final position being shown at $b$ in Fig. 4 and at the same time rotating the sleeve 10 clockwise so that the pins 14 move from the axis $c$ to the axis $d$.

During this rotation it will be noted that the pins 14 and 24 move inwardly from their outer limits in the non-circumferential slots 32 and have moved about half way to their inner limit in Fig. 4 where the expansible elements 30 are contacting the groove 51 of the bore of the work 50 to indicate the internal diameter thereof. Ordinary internal gauges can be used for the bore itself but where there is a counterbore or groove such as shown at 51 my gauge has special advantage in being able to expand thereinto. The expansion referred to is also shown by dotted positions of the elements 30 in Fig. 1. Obviously, the movement clockwise and counter-clockwise just referred to is only relative and the sleeve 10 may remain stationary while the shaft 20 rotates counter-clockwise, or the shaft may remain stationary while the sleeve rotates clockwise. Either way the pins 14 and 24 move outwardly in the slots 32 and in the adjustment of Fig. 4 the elements 30 have expanded about one-half their possible expansion as limited by the outer ends of the slots 32. The lengths of the slots therefore determine the range of the expansible structure and the dimensions and relationships of parts may be varied as required for different gauges or type of work, etc.

Initially the dial gauge may be set by gauging a master or test ring having an accurately designated bore. Once set, the gauge will thereafter accurately indicate that the bore of the work is the same, or departs plus or minus from that of the test ring and, of course, the position of the dial needle 44 indicates the magnitude of such departure. The arm 26 is preferably secured to the shaft 20 so that it extends approximately parallel to the flange 18 when the desired diameter is being gauged.

When using the device as a bushing puller as in Fig. 6, the knobs 17 and 27 are used to rotate the pins 14 and 24 about the axis of 10 and 20 relative to each other from the position of Fig. 3 with the elements 30 contracted to the position of Fig. 4 with them expanded as shown in Fig. 6. At that time the elements 30 are back of the inner end of the bushing 54 and the bushing may then be manually pulled or a suitable jig used in a press for pulling the expansible structure and the bushing 54 with it.

It is believed that the operation of Figs. 8 and 9 is obvious from the description already made with respect to Figs. 1 to 5. As to Fig. 9A, the expansible structure is inserted while in the closed position such as illustrated in Fig. 8 and the extension 60 received in the bore 62 whereupon expansion is permitted to the position of Fig. 9 for indicating the difference between the diameters of 62 and 51c.

It is also believed that the operation of expanding the expansible elements 30d of Figs. 10 and 11 is obvious, whereas the form shown in Figs. 12 and 13 is operated in the same manner and the only difference that occurs is that instead of 24e sliding in a slot it pivots in the hole 34. For the same expansion then, the slot 32e must be twice as long, or if only as long as in Fig. 4, for instance, then the expansion is cut in half.

The expansible structure disclosed is novel in the provision of a relatively rotatable shaft and sleeve and a simple arrangement for expanding the element or elements 30 by means of one or more pins on each of the sleeve and shaft entering suitable (non-circumferential) slots, or an opening and a non-circumferential slot, in the expansible element or elements, and it is my intention to cover by my claims both the expansible structure per se and the combination thereof with indicating means whereby the expansible structure may be used as an internal gauge, as well as for bushing pulling service and the like.

Some changes may be made in the construction and arrangement of the parts of my disclosed structure without departing from the real spirit and purpose of my invention. It is therefore my intention to also cover by my claims any modified forms of structure or use of mechanical equivalents which may reasonably be included within their scope.

I claim as my invention:

1. In an internal gauge structure, a sleeve, a shaft oscillatable therein and extending from one end thereof, a head on said shaft, a projection on one end of said sleeve projecting toward said head, a projection on said head projecting toward said sleeve, an expansible element between said sleeve and said head and having a pair of openings receiving said projections, said openings being slotted non-circumferentially whereby they permit floating of said expansible element between its minimum and maximum adjustments and relative rotation of said sleeve and shaft in one direction moves said expansible element to increase the distance between its outer edge and the axis of said sleeve and shaft and relative rotation thereof in the opposite direction decreases said distance, and means to indicate the degree of such relative rotation.

2. In a structure of the character disclosed, a sleeve and a shaft relatively oscillatable, a projection on each of said sleeve and shaft and projecting toward each other, an expansible element between said sleeve and shaft and having slotted openings receiving said projections, said openings being slots which are aligned in relation to each other whereby, between minimum and maximum adjustment, said expansible element may shift relative to said projections without increase or decrease of the distance between the axis of said sleeve or shaft and the outer extremity of said expansible element, and means to relatively oscillate said sleeve and shaft.

3. In an internal gauge structure, a sleeve, a shaft oscillatable therein and extending from one end thereof, a head on said shaft, a pair of diametrically opposite projections on one end of said sleeve projecting toward said head, a pair of diametrically opposite projections on said head projecting toward said sleeve, a pair of expansible elements between said sleeve and head and having slots receiving said projections, said slots being non-circumferential whereby relative rotation in one direction of said sleeve and shaft move said expansible elements to increase the distance between diametrically opposite edges thereof and relative rotation thereof in the opposite direction decreases the distance therebetween, and means to indicate the oscillation and thereby the diameter across said opposite edges.

4. In an internal gauge structure, a sleeve, a shaft oscillatable therein and extending from one end thereof, a head on said shaft, a projection on end end of said sleeve projecting toward said head, a projection on said head projecting toward said sleeve, and an expansible element between said sleeve and head and having openings receiving said projections, said openings being slots which are non-circumferentially arranged whereby relative rotation in one direction of said sleeve and shaft moves said expansible element to increase the distance to the outer edge thereof and relative rotation thereof in the opposite direction decreases said distance and, between minimum and maximum, said expansible element may shift relative to said projections to seek the true diameter of the work being gauged.

5. In a device of the class described, a sleeve and a shaft relatively oscillatable, said shaft projecting from one end of said sleeve, a head on said shaft adjacent said end of said sleeve, a pair of diametrically opposite pins on said end of said sleeve projecting toward said head, a pair of diametrically opposite pins on said head projecting toward said end of said sleeve, a pair of C-shaped elements having non-circumferential slots adjacent the ends of their arms and receiving said pins with each C-shaped element receiving one pin of the sleeve and one pin of the head, and means to oscillate said sleeve and shaft relatively and to indicate the degree of oscillation.

6. In a structure of the kind disclosed, a sleeve and a shaft therein, said shaft projecting from one end of said sleeve, a head on said projecting end of said shaft adjacent said one end of said sleeve, a pair of diametrically opposite pins on said end of said sleeve projecting toward said head, a pair of diametrically opposite pins on said head projecting toward said end of said sleeve, a pair of C-shaped elements having non-circumferential slots adjacent the ends of their arms and located between said head and said end of said sleeve, said slots receiving said pins with each C-shaped element receiving one pin of the sleeve and one pin of the head, and means to relatively oscillate said sleeve and shaft.

7. In a structure of the kind disclosed, a sleeve and a shaft relatively oscillatable, a head on said shaft, a plurality of circumferentially located pins on said sleeve projecting toward said head, a pair of circumferentially located pins on said head projecting toward said sleeve, a pair of expansible elements each having a pair of openings which are non-circumferential slots aligned with each other in each expansible element and receiving said pins with each expansible element receiving one pin of the sleeve and one pin of the head, and means to oscillate said shaft relative to said sleeve.

8. In an expansible structure of the character disclosed, a sleeve, a shaft oscillatable therein and extending from one end thereof, a disc-like head on said shaft spaced from said sleeve, a pair of relatively flat elements between said head and said sleeve and having non-circumferential slots at opposite ends thereof, said sleeve having a pair of diametrically oppositely arranged pins projecting through a slot of each of said expansible elements, said head likewise having a pair of diametrically oppositely arranged pins projecting through the other slots of said elements whereby relative rotation of said shaft and sleeve in one direction moves said expansible elements radially outward and relative movement in the other direction moves them radially inward, means to rotate said shaft and sleeve relatively, and means to indicate the degree of rotation.

9. In an expansible structure of the character disclosed, a sleeve, a shaft oscillatable therein and extending from one end thereof, a head on said shaft spaced from said sleeve, a flat arc-shaped element between said head and said sleeve and having a pair of openings, which are non-circumferential slots, in opposite arms thereof, said sleeve having a pin projecting through one of said openings and said head likewise having a pin projecting through the other of said openings of said element.

10. In an expansible structure, a sleeve, a shaft oscillatable therein, a disc-like head on said shaft spaced from said sleeve, a pair of relatively flat arc-shaped elements in the space between said head and said sleeve and having opposite non-circumferential slots, said sleeve having a pair of opposite pins projecting through a slot of each of said expansible elements, said head likewise having a pair of opposite pins projecting through the other slots of said elements whereby relative rotation of said shaft and sleeve in one direction moves said expansible elements outward and relative movement in the other direction moves them inward, means to relatively oscillate said shaft and sleeve, and means to indicate the degree of oscillation.

References Cited in the file of this patent

FOREIGN PATENTS

| | | |
|---|---|---|
| 20,693/05 | Great Britain | Aug. 12, 1905 |
| 458,898 | Italy | Aug. 4, 1950 |